Feb. 26, 1924. 1,484,662
H. MORRISON
CHUCKING ATTACHMENT FOR THREADING MACHINES
Filed May 25, 1921 — 2 Sheets-Sheet 2
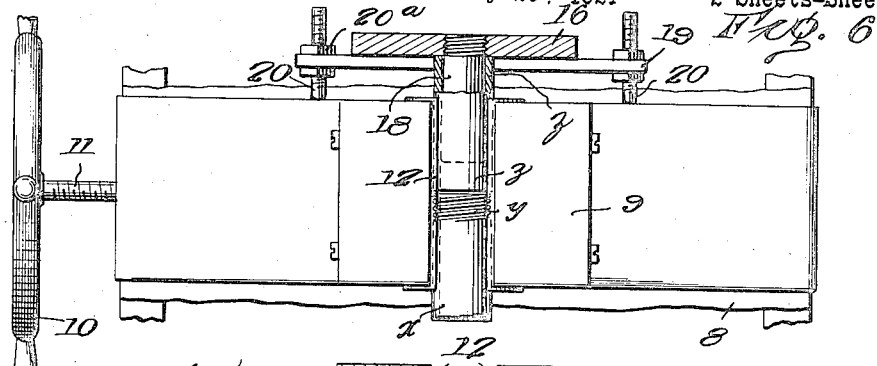
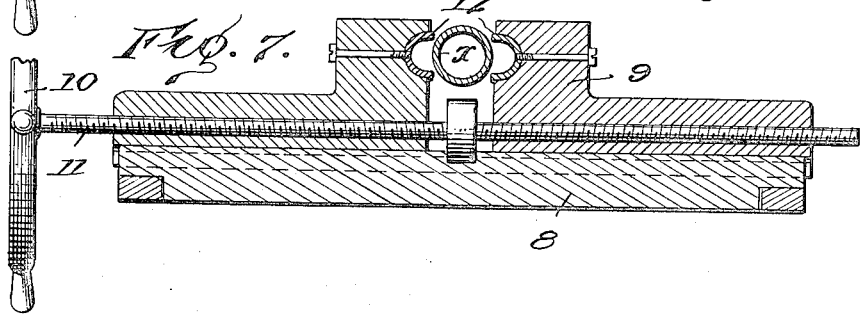
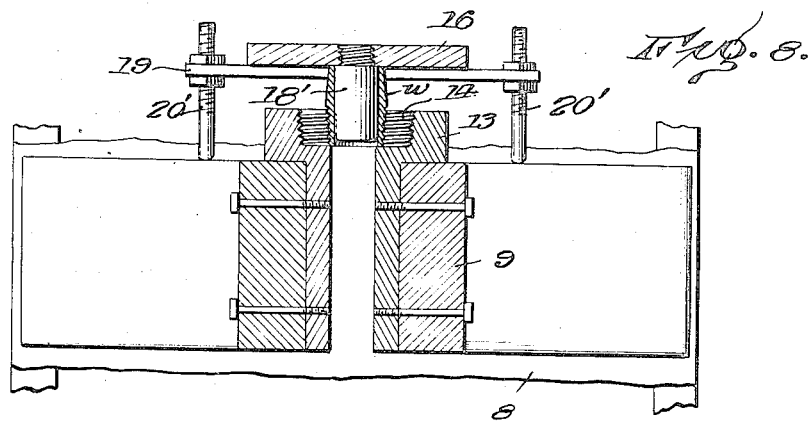
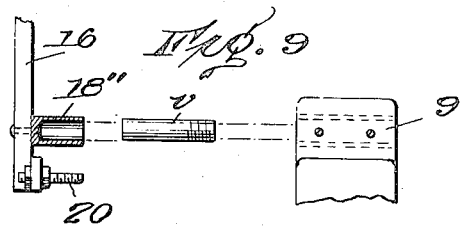
Inventor
Hackley Morrison,
By Prentiss, Stone & Boyden,
Attorneys Patented Feb. 26, 1924.

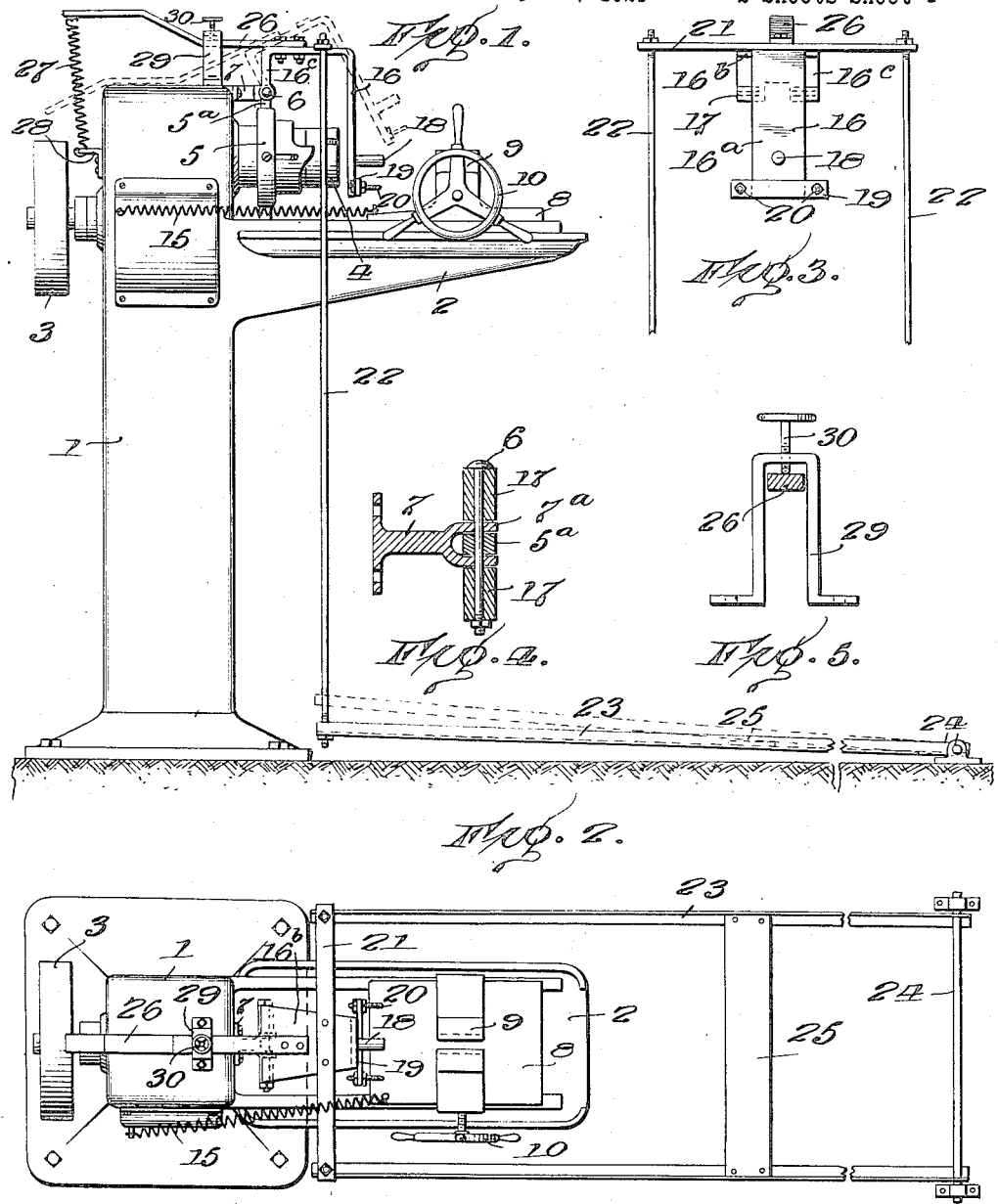

1,484,662

UNITED STATES PATENT OFFICE.

HACKLEY MORRISON, OF RICHMOND, VIRGINIA.

CHUCKING ATTACHMENT FOR THREADING MACHINES.

Application filed May 25, 1921. Serial No. 472,457.

*To all whom it may concern:*

Be it known that I, HACKLEY MORRISON, a citizen of the United States, residing at Richmond, in the county of Henrico and State of Virginia, have invented certain new and useful Improvements in Chucking Attachments for Threading Machines, of which the following is a specification.

This invention relates to threading machines, and more particularly to machines for threading relatively short blanks, such as pipe nipples, bolts, and the like.

The present invention is especially advantageous when employed in connection with threading machines of the type comprising a relatively fixed rotary die head and a slidably mounted work holding chuck, movable toward and from such die head, although in many of its aspects the invention is not limited to use with a machine of this character.

Machines of the type to which my invention relates are equipped with a die head of the self-opening variety, such die heads, as is well known, being provided with a tripping device which serves to automatically open the head and withdraw the dies from the work after the cutting has progressed to a predetermined point.

In operating machines of this character in which a movable chuck, as above mentioned, is employed, it has heretofore been the usual practice for the attendant to insert the blanks in the chuck by hand. This method is a slow one at best, and occasions great loss of time. Moreover, it is difficult, if not impossible, by the manual method, to accurately position the blanks in the chuck so that all of said blanks will be threaded a uniform distance.

The above difficulties obtain even in the manufacture of nipples and bolts with a space between the two threaded ends, with which the chuck jaws may engage. In the manufacture of close nipples, however, the inherent difficulties attendant upon the manual chucking become even more serious. With close nipples it is necessary to provide threaded chuck jaws or grips for holding the threaded end of the nipple, in order to thread the other end, and it has been found in practice that damage is often caused both the nipple blank and the chuck jaws by reason of the fact that the blank is not properly alined in the jaws before they are closed. This failure to properly aline the blank results in the threads on the blank and the threads on the jaws becoming crossed, thus damaging both threads. Moreover, when using threaded grips or jaws, it has been found that, when such jaws are opened after the threading operation is complete, the finished blank almost invariably sticks or adheres to one jaw or the other, thus making it necessary to tap the blank with a hammer in order to release it. When this is done, the blank frequently falls on to the bed of the machine and becomes covered with chips or other foreign matter, which is highly objectionable.

The objects of the present invention are therefore to provide a chucking attachment for a machine of this character which will obviate and avoid the above mentioned difficulties. The invention seeks to provide a movable carrier for supporting the blanks in position in line with the axis of the chuck jaws so as to insure proper alinement, and in the case of close nipples, to insure proper engagement of the threads of the blank and chuck jaws. Further, my improved chucking attachment provides means for supporting and holding the blank in a central position while the chuck jaws separate, thus causing the blank to be stripped from both jaws, instead of sticking to one or the other, while at the same time, the blank is supported and prevented from falling. The movable carrier for supporting the nipples is so designed that one blank may be placed upon the carrier while another blank is being threaded, thus effecting a great saving in time.

In order that the invention may be readily understood, reference is had to the accompanying drawings forming part of this specification, and in which:—

Figure 1 is a side elevation of a threading machine with my improved chucking attachment applied thereto;

Figure 2 is a plan view thereof;

Figure 3 is a front elevation of the chucking attachment itself;

Figure 4 is a horizontal section on an enlarged scale showing the method of pivotally mounting the chucking attachment on the frame of the machine;

Figure 5 is a front elevation on an enlarged scale of an adjustable stop for limiting the movement of the chucking device, parts being shown in section;

Figure 6 is a plan view on an enlarged scale showing the chuck and chucking attachment, and illustrating two blanks in position, parts being shown in horizontal section;

Figure 7 is a vertical transverse section through the chuck shown in Figure 6;

Figure 8 is a sectional plan view of the chuck and chucking attachment as used for close nipples; and Figure 9 is a fragmentary side elevation, partly in section, showing a modified construction of carrier which may be employed and which is especially useful for chucking solid blanks, such as those from which bolts are made.

Referring to the drawings in detail, 1 designates the frame or pedestal of a threading machine of any well known type, having a bed or arm 2 and a belt pulley 3 by means of which power is applied. The die head is indicated at 4 and may be of any well known or desired construction. In one type of machine the collapsible dies are operated or tripped by means of a yoke 5 having a portion 5ª pivoted by means of a pin 6 between the forked ends 7ª of a bracket 7 rigidly secured to the machine frame at a point above the die head.

8 designates the carriage which is slidable upon suitable ways carried by the bed 2. On this carriage are mounted a pair of chuck jaws or members 9 operated by means of a hand wheel 10 which is attached to a right and left screw 11 engaging the chuck jaws.

In the case of plain or space nipples or rods the chuck jaws are provided with C-shaped grips 12 adapted to engage the blank $x$, as shown in Figure 7, while in the case of close nipples, the chuck jaws 9 are provided with grips 13 having at one end a threaded socket 14 adapted to engage the threads on the end of a partially finished blank $w$, as shown in Figure 8.

All of the above features of the machine as so far described, form no part of my invention and may be of the usual or any desired construction. In the manual operation of a machine of this type as heretofore practiced, the operator simply inserts a blank between the chuck jaws 9 with its end projecting toward the die head 4 to the desired extent, and then pushes the carriage with the chuck jaws and blank toward the die head. As soon as the dies take hold, he releases the carriage and it is drawn toward the die head by the action of the dies until the die head is tripped open by a suitable stop, thus determining the length of thread cut. The operator had to stand idle while the threading was taking place, and after it was over had to draw back the carriage, release the chuck, remove the nipple or bolt and insert a new blank. As above stated, this was a slow method and very unsatisfactory for many reasons, especially in the case of close nipples.

In using my improved attachment, I have found it desirable to employ one or more springs 15 (see Figure 1) attached at one end to the carriage 8, and at the other end to the frame of the machine, such springs tending to draw the carriage toward the die head, so that the carriage when released by the operator will automatically move forward under the influence of such springs.

My improved attachment comprises a movable carrier which is preferably in the form of a swinging bracket 16. This comprises, as shown in Figures 1, 2 and 3, a main vertical portion 16ª, a horizontal portion 16ᵇ, and a rear or secondary vertical portion 16ᶜ, this latter being of such length as to raise the other parts of the bracket to the proper height. The end of the portion 16ᶜ is provided with a pair of perforated ears 17 adapted to straddle the forked bracket 7, the ears 17 and the portion 5ª of the yoke 5 being all secured to the bracket 7 by means of a common pivot pin 6, as clearly shown in Figure 4. In machines where the yoke 5 is pivoted at one side, the bracket 7 is provided as part of the present attachment. In either case, the entire bracket is capable of swinging about the pivot pin 6, and may assume, at one limit of its movement, the position shown in dotted lines in Figure 1.

The vertical portion 16ª of the bracket carries a pin 18 (or 18′, Figure 8) projecting at right angles thereto toward the chuck, and so located that when the bracket is in the position shown by full lines in Figure 1, the pin lies on a common axis passing through the center of the die head and the chuck jaws.

Secured to the lower end of the bracket 16 is a cross bar 19 or its equivalent, and at the ends of this cross bar are carried a pair of stops 20. These stops are preferably in the form of stud bolts, as shown in Figure 6, and are provided with lock nuts 20ª, by means of which they may be set or adjusted so as to project to a greater or less extent from the face of the cross bar 19. It will be understood that the bracket 16 is of comparatively rigid construction and that these stops 20 are for the purpose of limiting the forward movement of the carriage 8 during the chucking operation, as hereinafter described. The ends of the stops 20 engage with the face of the chuck jaws 9, as shown in Figure 6.

In order to shift the bracket or carrier 16 from dotted to full line position I provide a treadle mechanism. This comprises a pair of rods 22 arranged one on each side of the bed of the machine and secured at their upper ends to a cross bar 21 attached to the bracket 16. The lower ends of the rods 22 are secured to the free ends of a pair of levers 23, shown as angle irons, and pivoted at their other end, as indicated at 24, to a fixed support mounted on the floor. Extending between the bars or levers 23 is a platform or treadle 25 on which the operator can step when he desires to shift the carrier. It will be understood that the operator normally stands adjacent the end of the bed 2 in the space between the side bars 23 so that the treadle 25 is within easy reach of his foot.

Secured to the horizontal portion 16$^b$ of the bracket 16, is an arm 26 which projects beyond the frame of the machine and is attached at its free end to one end of a spring 27, the other end of which is made fast to a fixed bracket 28. The arm extends through or adjacent to another fixed bracket 29 carrying an adjustable stop screw 30 which is adapted to bear against the upper side of the arm 26 as shown in Figure 5, and thus limit the movement thereof. It will be seen that this stop screw 30 can be so set as to bring the pin 18 into accurate alinement with the chuck and die head when the treadle is depressed. When the treadle is released the spring 27 swings the bracket 16 into dotted line position.

The method of using my improved chucking attachment for the manufacture of space nipples will now be described. The operator slips a blank over the pin 18 when it is in the position shown in dotted lines in Figure 1. This pin should be of such size as to snugly fit the nipple so that there is very little play. The operator then steps upon the treadle 25 and swings the bracket with the pin 18 carrying the nipple blank, into the position shown in full lines in Figure 1. Having slightly opened the chuck jaws he then releases the carriage and permits the spring 15 to move it forward, the chuck jaws enveloping the blank during such forward movement. It will be understood that the extent of this forward movement is determined by the stop pins 20, and that therefore the extent to which the blank enters the chuck, or in other words, the length of the projecting portion of the blank, is accurately gaged. After the carriage has gone forward and the blank enters the chuck as described, the operator tightens the chuck jaws by means of the hand wheel 10, draws back the carriage and steps off of the treadle. The bracket or carrier then swings up to dotted line position so that its lower end is clear of the path of movement of the chuck jaws, and thereupon the operator releases the carriage permitting it to move forward under the influence of spring 15 and carry the blank into engagement with the die head. While the threading operation is taking place, the operator slips another blank on the pin 18, and as soon as the die head is tripped open he pulls back the carriage and at the same time steps upon the treadle, thus bringing the second blank down into chucking position. The operator thereupon slightly loosens the chuck jaws and permits the carriage to again go forward. The second nipple strikes the end of the first nipple forcing it back through the chuck jaws and partially or wholly ejecting it therefrom, while at the same time it is itself properly positioned in the chuck. In other words, the second nipple displaces the first nipple and is automatically substituted therefor. The operator then tightens the chuck and draws back the carriage, stepping off of the treadle, and then releases the carriage permitting the second nipple to go forward into the die head. This cycle of operations is continued, each successive blank displacing the preceding blank or blanks in the chuck, and the finished blanks being successively ejected from the rear of the chuck, and the operator utilizing the threading time of each blank for placing a new blank on the pin 18.

Referring to Figure 6, I have designated one blank by $x$, and another blank by $z$, and have shown the parts in the position they occupy at the moment of chucking the second blank, the first blank $x$ having had threads $y$ cut thereon during the preceding cycle. It will be noted that the above method of operation can be employed first to thread the blanks at one end and subsequently to thread them at the other end, the threading of each end, of course, requiring a separate cycle of operation. In other words, after the blanks have been threaded as indicated at $y$ in Figure 6, and have been ejected from the chuck they can be reversed, end for end, and again placed upon the pin 18.

It will be seen that by my improved method the blanks are held in perfect alinement with the chuck and that all of the blanks are so positioned in the chuck that they project toward the die to exactly the same extent, thus insuring threads of uniform length. Moreover, I have found that by virtue of the saving of time, as above explained, an operator using my attachment can increase the production of the machine at least fifty per cent over the output which is possible with manual chucking.

In manufacturing close nipples the same method of procedure and the same cycle of operations as above described can be employed for threading the first end while the blank end is held in the chuck. In threading the second end of such close nipples, however, the threaded end thereof is gripped in the threaded chuck jaws 14, as shown at w in Fig. 8. Assuming that it is desired to thread the second end of a lot of close nipples, the operation is as follows. A partly finished blank is slipped over the pin 18' (Figure 8), unfinished end toward the bracket 16, and the bracket is then swung down into position by means of the treadle, while the carriage is held in its retracted position. The jaws having been opened, the carriage is released and permitted to go forward until the jaws assume the position relative to the nipple as indicated in Figure 8, such position being determined by the stops 20' engaging the chuck. The jaws are then brought together, gripping the thread end of the nipple between the threaded grips, and, owing to the fact that the pin 18' holds the nipple in perfect alinement with the jaws, the threads properly mesh and the danger of crossed threads is eliminated. The threaded end having been gripped as described, the carriage is drawn back, the treadle released and the carriage then permitted to go forward again, thus bringing the unthreaded end of the blank into engagement with the die head. During the subsequent threading operation the operator does not place another blank upon the pin 18', but immediately that the threading operation is completed, he draws back the carriage and steps upon the treadle, again swinging the pin 18' down into position in alinement with the chuck. While still standing on the treadle the operator releases the carriage and it goes forward, again pushing the finished nipple over the pin 18. The operator then opens the jaws and withdraws the carriage, leaving the finished nipple supported by the pin 18', from which it is removed by hand. By placing the finished nipple over the pin before opening the jaws, the nipple is held in a central position while the jaws are separated from it. Thus the difficulty due to the nipple sticking to the jaws is overcome and the danger of the nipple falling down on to the bed of the machine is avoided. I have found that by this method more perfect and uniform work can be produced, and the output of the machine largely increased.

Referring to Figure 9, it will be seen that in some cases I contemplate using a socket member 18" instead of a pin, such as 18 or 18'. Such a socket member can be effectively employed to support either space nipple blanks, or solid blanks, such as indicated at v, which may be used in the manufacture of various kinds of bolts. The operation of the attachment is the same whether a pin or a socket member is employed to support the blanks.

It will thus be seen that I have provided a chucking attachment for threading machines by means of which accurate straight threads of uniform length are insured and damage to the threads of close nipples prevented, and it is thought that the many advantages of the invention will be readily appreciated without further discussion.

What I claim is:

1. The combination with a machine for threading relatively short blanks, said machine having a rotary die head and a work holding chuck reciprocable toward and from said die head, of means independent of said chuck for supporting a blank in axial alinement with said die head and in position to enter the chuck as the latter is moved toward said die head.

2. The combination with a machine for threading relatively short blanks, said machine having a rotary die head and a work holding chuck having an open end and reciprocable toward and from said die head, of means for supporting a blank in position to enter said open end of the chuck as the latter is moved toward said die head, and means for limiting to a predetermined amount the extent to which the blank so enters.

3. The combination with a machine for threading relatively short blanks, said machine having a rotary die head and a work holding chuck having an open end and reciprocable toward and from said die head, of means for supporting a blank in position to enter said open end of the chuck as the latter is moved toward said die head, and an adjustable stop for limiting such movement during the chucking operation.

4. The combination with a machine for threading relatively short blanks, said machine having a rotary die head and a work holding chuck reciprocable toward and from said die head, of a movable carrier for the blanks, and means for shifting said carrier so as to bring a blank into position to enter the chuck as the latter is moved toward said die head.

5. The combination with a machine for threading relatively short blanks, said machine having a rotary die head and a work holding chuck reciprocable toward and from said die head, of a movable carrier for the blanks, means for shifting said carrier so as to bring a blank into position to enter the chuck as the latter is moved toward said die head; and a stop member, shiftable with said carrier, for limiting such movement during the chucking operation.

6. The combination with a machine for threading relatively short blanks, said machine having a rotary die head and a work holding chuck axially alined therewith, of means for temporarily supporting a blank between said die head and chuck, and in axial alinement with both.

7. The combination with a machine for threading relatively short blanks, said machine having a rotary die head and a work holding chuck axially alined therewith, of a blank carrier movable into and out of line with the common axis of said die head and chuck.

8. The combination with a machine for threading relatively short blanks, said machine having a rotary die head and a work holding chuck axially alined therewith, of a movable carrier for the blanks, and means for shifting said carrier into and out of a position intermediate the die head and chuck, and in line therewith.

9. The combination with a machine for threading relatively short blanks, said machine having a rotary die head and a work holding chuck movable toward and from said die head, of a pivoted blank carrier, and means for swinging said carrier on its pivot to bring a blank into position to enter the chuck as the latter is moved toward said die head.

10. The combination with a machine for threading relatively short blanks, said machine having a rotary die head and a work holding chuck movable toward and from said die head and axially alined therewith, of a pivoted blank carrier, and means for swinging said carrier on its pivot to bring a blank into alinement with said chuck and die head.

11. The combination with a machine for threading relatively short blanks, said machine having a rotary die head and a work holding chuck movable toward and from said die head and axially alined therewith, of a pivoted blank carrier, and means for swinging said carrier on its pivot to bring a blank into a position between said die head and chuck, and in alinement therewith.

12. The combination with a machine for threading relatively short blanks, said machine comprising a rotary die head and a work holding chuck movable toward and from said die head, of a blank carrier pivoted at a point above said die head to swing in a vertical plane parallel with the axis of said die head, and means for swinging said carrier on its pivot to bring a blank downwardly into a position between said die head and chuck.

13. The combination with a machine for threading relatively short blanks, said machine having a rotary die head and a work holding chuck movable toward and from said die head, of a carrier comprising a holding member shaped to receive and support said blanks, and from which said blanks may be freely axially removed, and means for shifting said carrier to bring a blank supported by said member into the path of movement of said chuck.

14. The combination with a machine for threading pipe nipple blanks, said machine having a rotary die head and a chuck axially alined therewith, of a carrier comprising a supporting pin over which said blanks may be slipped, and means for moving said carrier so as to bring said pin and the blank supported thereby into a position in alinement with said die head and chuck.

15. The combination with a machine for threading pipe nipple blanks, said machine having a rotary die head and a chuck movable toward and from said die head and having blank gripping jaws, of a carrier comprising a supporting pin over which said blanks may be slipped, and means for moving said carrier so as to bring said pin and the blank supported thereby into line with the path of movement of said chuck jaws.

16. In a threading machine, the combination with a rotary die-head, and a work holding chuck, movable toward and from said die head, of means independent of said chuck for supporting a blank in alinement with said die head, and in position to enter the chuck as the latter is moved toward said die head, and means tending constantly to move said chuck in one direction.

17. In a threading machine, the combination with a rotary die-head, and a work holding chuck having an open end and movable toward and from said die head, of means for supporting a blank in position to enter said open end of the chuck as the latter is moved toward said die head, and a spring tending constantly to move said chuck toward said blank supporting means and die head.

In testimony whereof I affix my signature.

HACKLEY MORRISON.